US011755321B2

(12) United States Patent
Mendel et al.

(10) Patent No.: US 11,755,321 B2
(45) Date of Patent: Sep. 12, 2023

(54) CIRCUIT AND METHOD FOR THE ROTATION-INVARIANT EXECUTION OF ONE OR MORE OPERATIONS WITH AT LEAST ONE OPERAND

(71) Applicant: Infineon Technologies AG, Neubiberg (DE)

(72) Inventors: Florian Mendel, Munich (DE); Martin Schlaeffer, Munich (DE); Erich Wenger, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 53 days.

(21) Appl. No.: 17/574,576

(22) Filed: Jan. 13, 2022

(65) Prior Publication Data

US 2022/0222076 A1   Jul. 14, 2022

(30) Foreign Application Priority Data

Jan. 13, 2021   (DE) .................... 102021100538.8

(51) Int. Cl.
*G06F 9/30* (2018.01)
*G06F 21/60* (2013.01)
*G06F 21/75* (2013.01)

(52) U.S. Cl.
CPC ........ *G06F 9/30032* (2013.01); *G06F 9/3001* (2013.01); *G06F 9/30018* (2013.01); *G06F 21/602* (2013.01); *G06F 21/75* (2013.01)

(58) Field of Classification Search
CPC ............... G06F 9/30032; G06F 9/3001; G06F 9/30018; G06F 21/602; G06F 21/75
See application file for complete search history.

(56) References Cited

U.S. PATENT DOCUMENTS 6,125,182 A     9/2000   Satterfield
9,027,104 B2 *  5/2015   Wolrich ................. G06F 21/64
                                                                380/28

(Continued)

FOREIGN PATENT DOCUMENTS

DE      10201449 C1     8/2003
DE      102014001647 A1 8/2015
DE      102018113475 A1 12/2019

OTHER PUBLICATIONS

German Office Action issued for the corresponding German patent application No. 10 2021 100 538.8, dated Oct. 14, 2021, 9 pages (for informational purposes only).

*Primary Examiner* — Corey S Faherty
(74) *Attorney, Agent, or Firm* — VIERING, JENTSCHURA & PARTNER MBB

(57) ABSTRACT

A circuit includes a data input that is configured to receive a data word, the data word including at least one operand which is rotated by a number of bits given by a rotation parameter, a first control input that is configured to receive the rotation parameter, a second control input that is configured to receive an indication of an operation to be performed, a first subcircuit that is configured to generate an operation- and rotation-dependent bit mask from the rotation parameter and the indication of the operation to be performed, a second subcircuit which is configured to process the at least one operand as a function of the bit mask and the operation to be performed, wherein the operand and the operation result generated by the processing remain in the rotated state, and a data output which is configured to output the operation result.

19 Claims, 7 Drawing Sheets

(56) References Cited

U.S. PATENT DOCUMENTS

| | | |
|---|---|---|
| 2005/0036618 A1 | 2/2005 | Gammel et al. |
| 2013/0132737 A1* | 5/2013 | Horsnell ................. G09C 1/00 712/225 |
| 2014/0189368 A1* | 7/2014 | Wolrich .............. G06F 15/8007 713/190 |
| 2015/0220307 A1 | 8/2015 | Heiss et al. |
| 2018/0167196 A1* | 6/2018 | Cooper ................... H04L 9/003 |
| 2019/0379529 A1 | 12/2019 | Meyer et al. |
| 2022/0171885 A1* | 6/2022 | Saarinen ................ H04L 9/002 |

\* cited by examiner

FIG 3

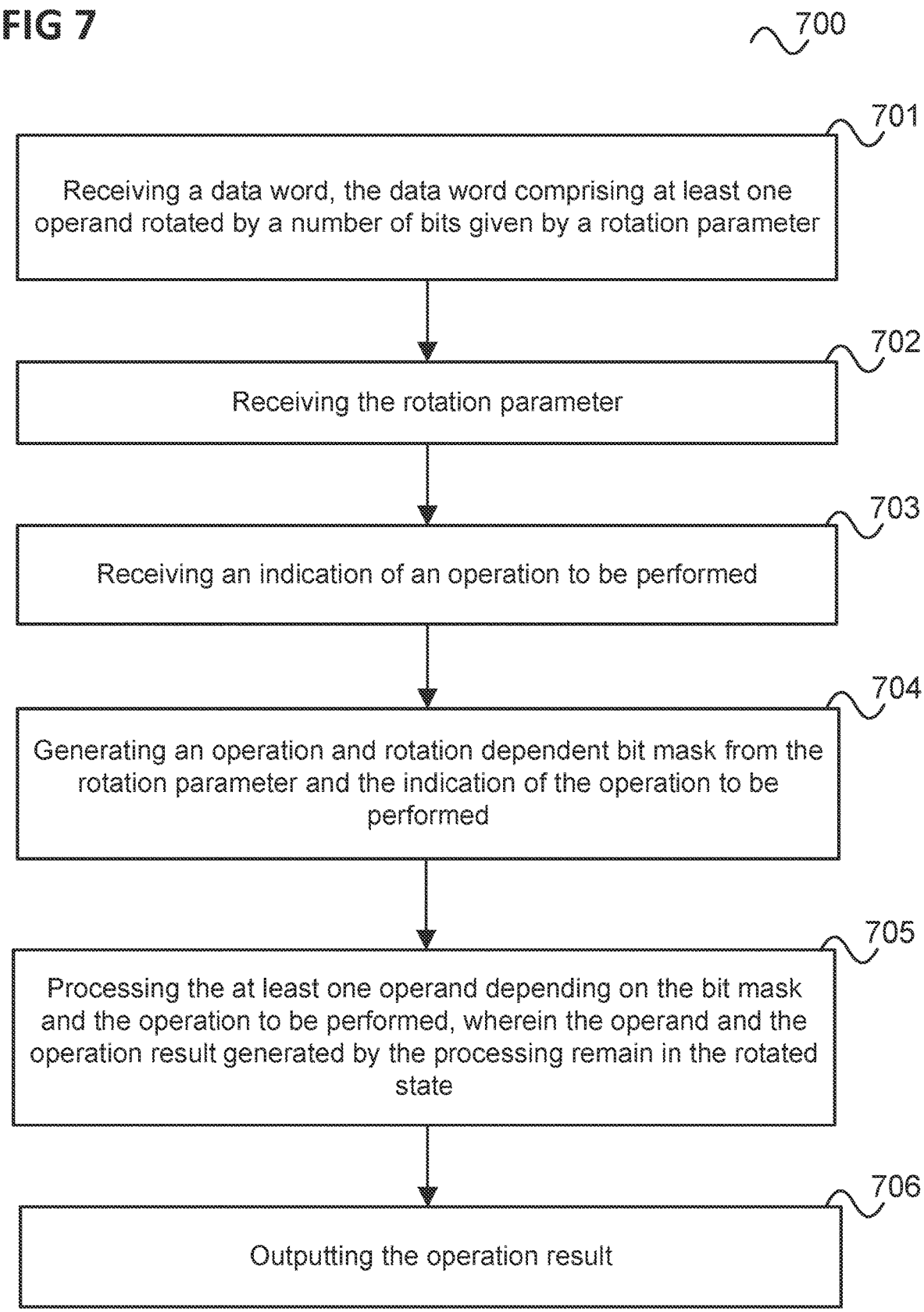

CIRCUIT AND METHOD FOR THE ROTATION-INVARIANT EXECUTION OF ONE OR MORE OPERATIONS WITH AT LEAST ONE OPERAND

CROSS-REFERENCE TO RELATED APPLICATION

This application claims priority to German Patent Application Serial No. 10 2021 100 538.8, which was filed on Jan. 13, 2021, and is incorporated herein by reference in its entirety.

TECHNICAL FIELD

Aspects of the disclosure generally relate to circuits and methods for rotation-invariant execution of one or more operations with at least one operand.

BACKGROUND

In the context of security-related applications, computer chips, such as on a smart card or in a control device in a vehicle, typically perform cryptographic processes for encryption, decryption and authentication, etc. Using these, data is processed, such as cryptographic keys, which are to be protected from access by an attacker (e.g., side-channel attacks). A typical security mechanism is the exclusive-or decomposition of data words into several sub-representatives (so-called "shares") and hiding, where randomness is introduced into the processing. Randomness can be introduced, for example, by randomly rotating data words before processing them, processing them in a rotated state, and then rotating them back. However, cryptographic techniques typically use operations that are not invariant to rotation of their operands, such as bitwise shift (with padding with zeros) and modular addition. Therefore, approaches are desirable that allow an implementation that is robust against side-channel attacks even for cryptographic methods that have such operations.

SUMMARY

According to one embodiment, a circuit is provided including a data input configured to receive a data word, the data word including at least one operand rotated by a number of bits given by a rotation parameter, a first control input configured to receive the rotation parameter, a second control input which is configured to receive an indication of an operation to be performed, a first subcircuit which is configured to generate an operation- and rotation-dependent bit mask from the rotation parameter and the indication of the operation to be performed, a second subcircuit which is configured to process the at least one operand as a function of the bit mask and the operation to be performed, wherein the operand and the operation result generated by the processing remain in the rotated state, and a data output which is configured to output the operation result.

According to a further embodiment, there is provided a method for performing one or more operations in a rotation-invariant manner with at least one operand according to the circuit described above.

BRIEF DESCRIPTION OF THE DRAWINGS

The figures do not represent actual scaling, but are intended to illustrate the principles of various aspects of the disclosure. Various aspects of the disclosure are described below with reference to the following figures.

FIG. 3 illustrates an example showing that the shift operation is generally not rotation-invariant.

FIG. 7 illustrates a flowchart illustrating a method for rotation-invariant execution of one or more operations with at least one operand, according to one embodiment.

DESCRIPTION

The following detailed description refers to the accompanying figures, which show details and examples of aspects of the disclosure. These aspects are described in sufficient detail to enable those skilled in the art to carry out the invention. Other aspect are also possible and the aspects of the disclosure may be modified structurally, logically and electrically without departing from the subject matter of the invention. The various aspects of the disclosure are not necessarily mutually exclusive, but different aspects of the disclosure may be combined with each other to form new aspects of the disclosure. In the context of this description, the terms "connected", "interconnected" as well as "coupled" are used to describe both a direct and an indirect connection, a direct or indirect connection as well as a direct or indirect coupling.

Figure 1:
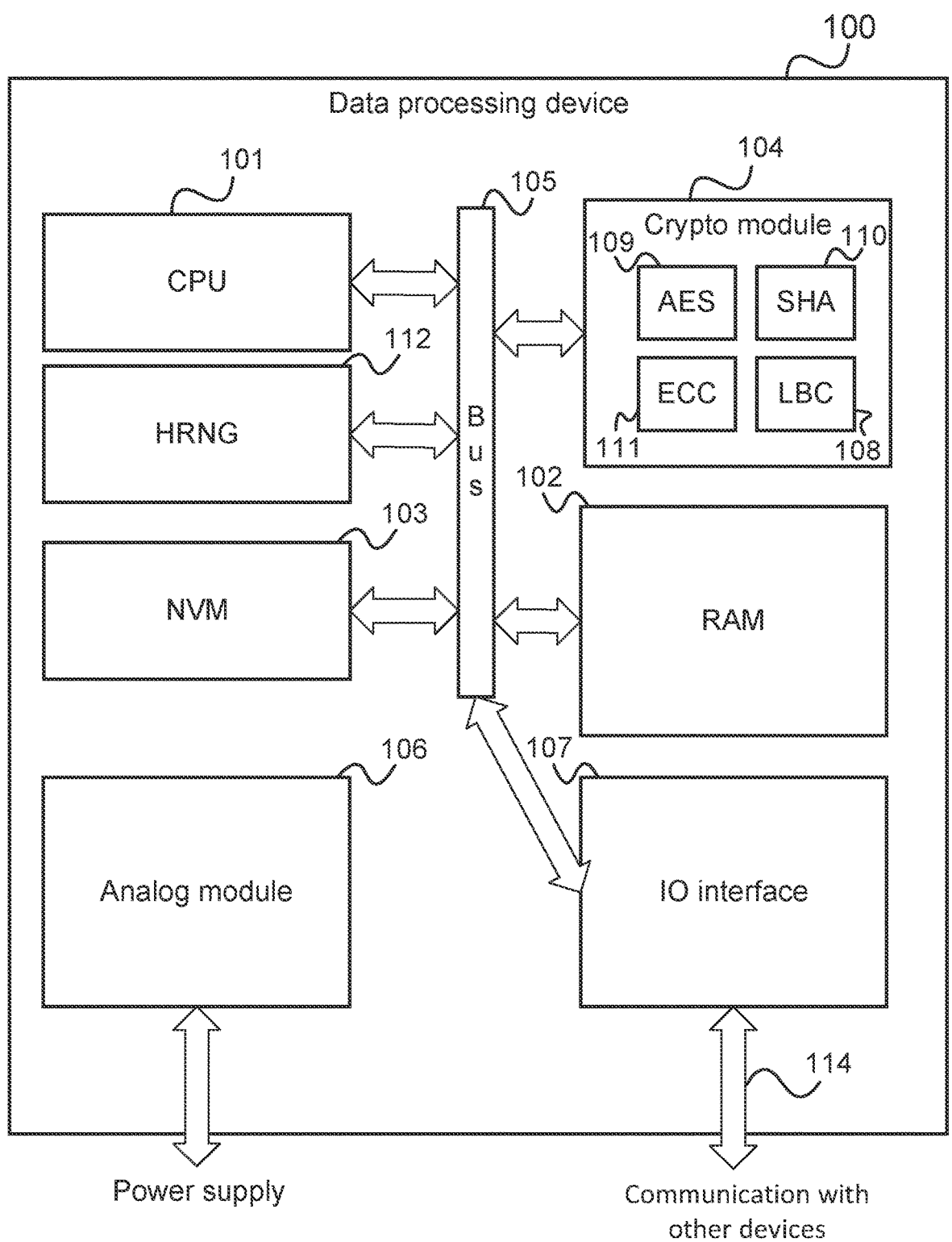
FIG. 1 illustrates an example of a data processing device for performing cryptographic operations.

FIG. 1 illustrates an example of a data processing device for performing cryptographic operations.

FIG. 1 illustrates an example data processing device 100 having a CPU (central processing unit, i.e., a main processor) 101, a RAM (random access memory) 102, a non-volatile memory 103 (NVM), a crypto module 104, an analog module 106, an input/output interface 107, and a (e.g., hardware) random number generator 112.

In this example, the CPU 101 has access to at least one crypto module 104 via a common bus 105 to which each crypto module 104 is connected. In particular, each crypto module 104 may include one or more crypto cores to perform certain cryptographic operations.

The CPU 101, the hardware random number generator 112, the NVM 103, the crypto module 104, the RAM 102, and the input/output interface 107 are connected to the bus 105. The input/output interface 107 may have a connection 114 to other devices similar to the data processing device 100.

Electrical energy is supplied to the analog module 106 via an electrical contact and/or via an electromagnetic field. This power is supplied to drive the circuitry of the data processing device 100, and in particular may allow the input/output interface to initiate and/or maintain connections to other devices via the connection 114.

Instructions for performing the processing and algorithms described below, in particular, may be stored in the NVM 103 and processed by the CPU 101. The processed data may be stored in the NVM 103 or in the RAM 102. Random numbers are provided by the hardware random number generator 112.

Cryptographic operations may be performed exclusively or at least partially on the crypto module 104. However, they may also be performed by the CPU 101 and a dedicated crypto module 104 may not be required.

For example, the components of the data processing device 100 may be implemented on a single chip. The data processing device 100 may be a smart card (or smart card module) powered by direct electrical contact or by an electromagnetic field. The data processing device 100 may be a fixed circuit or based on reconfigurable hardware (e.g., field programmable gate array (FPGA)). The data processing device 100 may be connected to a personal computer, microcontroller, FPGA, or smartphone system on a chip (SoC) or other components of a smartphone. The data processing device 100 may be a chip that acts as a Trusted Platform Module (TPM) and provides cryptographic functionality according to a standardized interface to a computer, smartphone, Internet of Things (IoT) device, or vehicle. However, the data processing device 100 may itself be a standalone data processing device, e.g., a personal computer, smartphone, etc.

When performing cryptographic operations such as decrypting encrypted data or signing data, secret data such as a cryptographic key is typically used. To ensure security, it is necessary to prevent an attacker from gaining information about such secret data, for example, through a side-channel attack. One way to protect against side-channel attacks is to introduce randomness into the processing of secret data by random rotation, as illustrated in FIG. 2.

Figure 2:
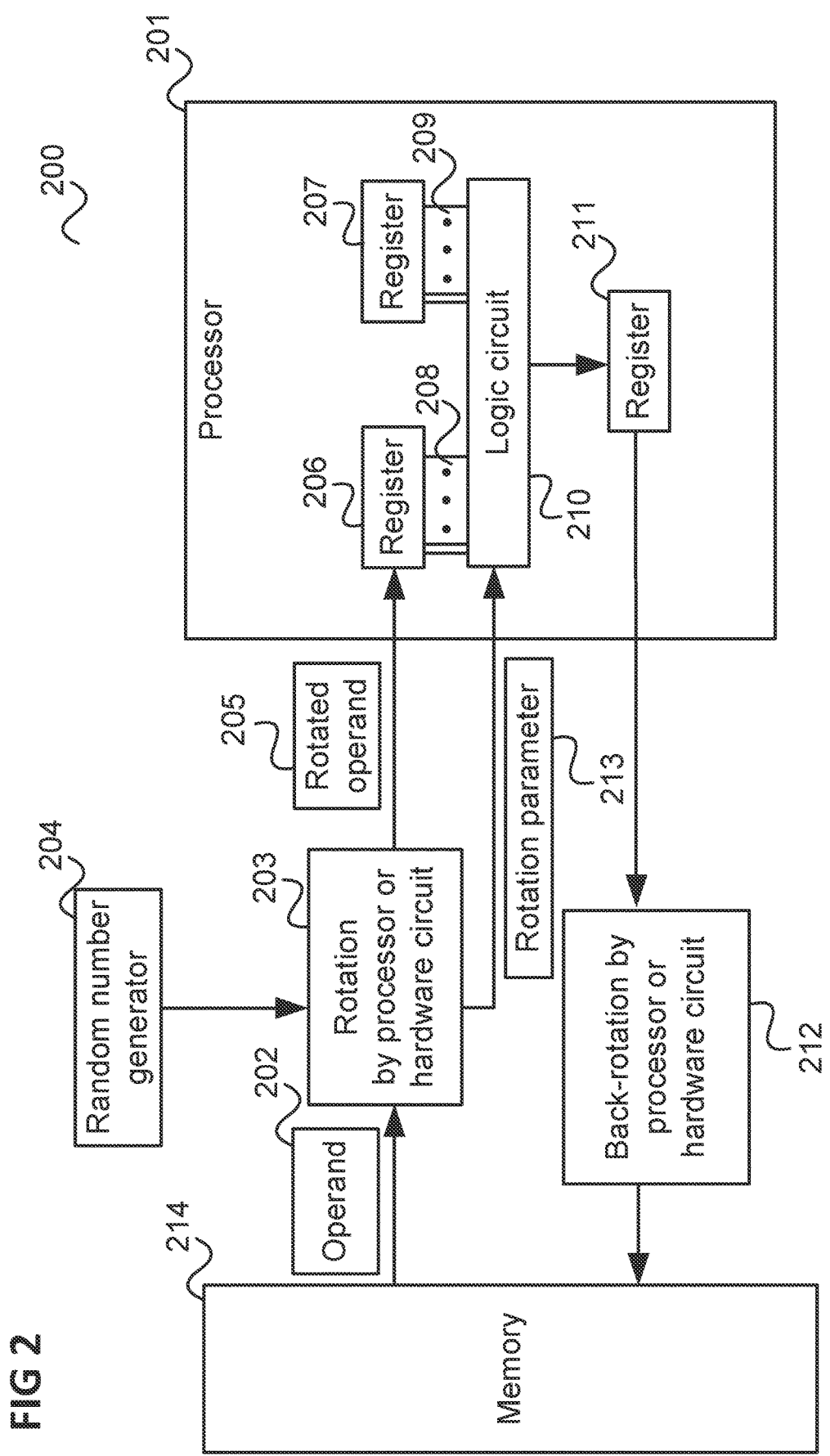
FIG. 2 illustrates a data processing device.

FIG. 2 illustrates a data processing device 200.

The data processing device 200 includes a processor 201. The processor corresponds, for example, to the CPU 101 or the crypto module 104.

A secret operand 202, for example a word of a cryptographic key, is rotated bit by bit by a rotation 203 (i.e. a rotation device) when loaded from a memory 214. The number of bit positions by which the operand 202 is rotated is random and depends, for example, on a random number provided by a random number generator 204. The result of the rotation is a rotated operand 205.

For example, the random number generator 204 corresponds to the random number generator 112.

The rotated operand 205 is stored in a register 206 of the processor 201. For operations with more than one operand (e.g. an addition), a further rotated operand can be stored accordingly in a further register 207 (or also several further rotated operands in several further registers).

Each register 206, 207 is connected via a respective set of bit lines (e.g. 32 bit lines each) 208, 209, to a logic circuit 210 (e.g. an ALU (Arithmetic Logic Unit)) configured to perform the respective operation. It should be noted that performing an operation by the logic circuit 210 may include processing a (rotated) operand, resaving the operand in a register 207, and processing again by the logic circuit 210. This means that performing an operation by the logic circuit 210 may include performing multiple sub-operations.

The rotation may be performed by dedicated hardware circuitry or within the processor itself, i.e., the rotation 203 may be implemented by the processor 201 itself, e.g., by executing appropriate software and using logic circuitry 210.

Thus, for example, the processor 201 first transforms all operands of the operation to be performed into the rotated domain and processes the operands using the logic circuit in the rotated domain. If an operand is processed multiple times (i.e., in multiple operations) each bit is stored at the same bit location of a register 206, 207, transported over the same bit line 208, 209, and processed at the same bit processing path of the logic circuit 210 on average only once every 32 times (for example, given an operand word length of 32 bits) due to the random operation. In other words, a bit is located on average only once every 32 times at the same bit location in the 32-bit data path of the processor, which may also include other elements such as caches. This increases the robustness against side channel attacks.

The result of the operation is stored in a result register 211 (which may correspond to one of the registers 206, 207) and is rotated back by a back-rotation 212 (which may be implemented by dedicated hardware circuitry or by the processor 201) before being stored in memory, for example.

In the example of FIG. 2, operands are dynamically re-randomized. As noted, re-randomization may be performed by dedicated hardware circuitry or by the processor 201. For example, in a computer program executed by the processor 201, an instruction may be provided after each loading of an operand 202 from the memory 214 and before each storing of a processing operand (i.e., the result of an operation) in the memory 214 such that the operand is rotated or the processed operand is re-rotated. For example, the operand is stored and rotated in a register 206, 207 during loading.

The operands may also be rotated in memory 214. This means that operands are rotated before they are written to memory 214, for example, after they are received via a communication interface or bus. This is done, for example, by dedicated hardware circuitry. The rotation is then transparent to both the memory and the processor and is static. It is removed by dedicated hardware upon transfer to another component (i.e., a component other than memory 214 and processor 201), such as a non-volatile memory or peripheral component. Thus, the rotated domain may extend to different extents.

Regardless of how far the rotated domain extends, the logic circuit 210 performs the operation to be performed in the rotated domain, i.e., processes one or more operands rotated by the rotation 203.

To this end, the logic circuit 210 executes the operation in such a way that it returns the correct result after the back rotation 212. This is not difficult for rotation invariant operations, since for these the logic circuit 210 does not need to take into account that the one or more operands are rotated.

An operation op with two operands A and B is rotation invariant if (A op B)<<<r=(A<<<r)op(B<<<r)

where "<<<r" denotes a bitwise rotation by r positions in the direction of the most significant bit (MSB), i.e. in the usual notation "to the left". A rotation means a cyclic rotation, i.e. a shift with re-insertion of bits shifted out at the other end (e.g. right, for a rotation to the left).

All bitwise operations like bitwise AND, bitwise OR, BIC (bitwise clear, i.e. A BIC B=A AND (NOT B)), bitwise XOR (exclusive OR) are rotation invariant.

The rotation itself is also rotation invariant:

(A<<<s)<<<r=(A<<<r)<<<s

If all operations of a cryptographic procedure F (which can be formulated as an algorithm with multiple operations) are rotation invariant, then the entire procedure F is rotation invariant:

F(A, B, C, . . . )<<<r=F(A<<<r, B<<<r, C<<<r, . . . )

Many symmetric cryptographic techniques use only bit-wise Boolean functions and rotations and are therefore rotation invariant, such as SHA-3 (provided the constants are treated as data and are also rotated).

However, there are also cryptographic methods that contain shift operations or modular additions and are therefore not rotation invariant, such as SHA-2.

Figure 3:
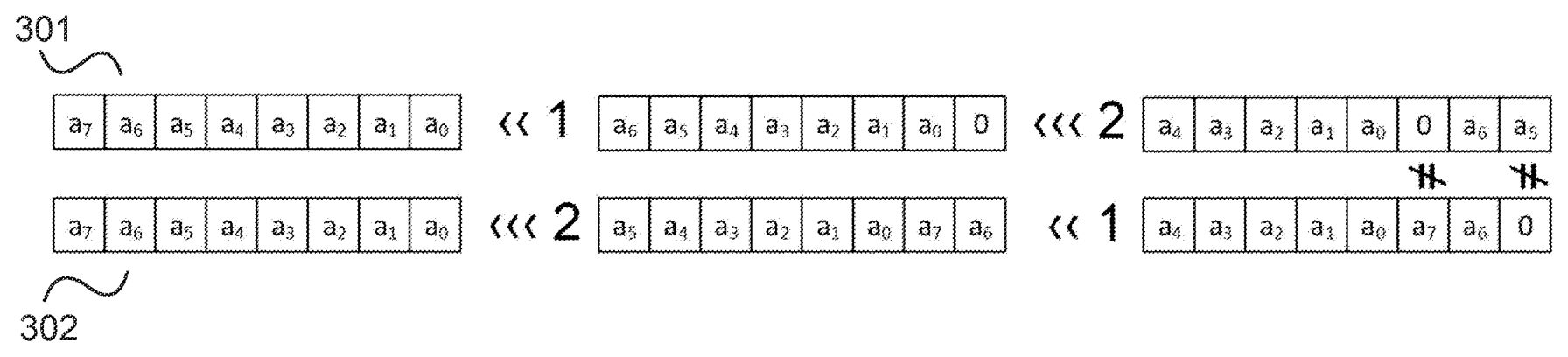

FIG. 3 illustrates an example showing that the shift operation is generally not rotation-invariant.

The first line 301 shows the calculation (A<<1)<<<2 and the second line 302 shows the calculation (A<<<2)<<1, where "<<s" denotes a shift to the left, so "<<1" denotes a shift of 1 to the left, with zeros (in this case, one zero) padding the right. A in this example is an 8-bit operand with bits $a_7$ to $a_0$.

As can be seen, the results of the two calculations do not agree, so the shift is not rotation invariant. Similarly, the modular addition is not rotation invariant.

According to various aspects of the disclosure, a non-rotation invariant operation is implemented by logic circuit 210 (e.g., for an extended instruction set of processor 201) by providing logic circuit 210 with, in addition to the "normal" operands of the operation, a rotation parameter 213 that indicates by how many positions the bits of the operands are rotated and takes this into account so that it produces a correct (rotated) result, i.e., so that holds true (op A)<<<r=op(A<<<r)

for an operation with one operand or (A op B)<<<r=(A<<<r)op(B<<<r)

for an operation with two operands, i.e. so that the operation is rotation invariant.

This is done, for example, by the logic circuit 210 computing rotated bit masks using the rotation parameter 213, which it uses to establish rotation invariance, such as for a shift operation or modular addition.

According to one embodiment, the implementation for a shift operation by the logic circuit 210 is based on the fact that A<<s gives the same result as (A<<<s) & (0xFF . . . F<<s)

where 0xFF . . . F is the hexadecimal representation of the number having as many binary digits as A, with all bits being 1. It is assumed here, for simplicity of representation, that the number of bits of A is divisible by four. The character & denotes the bitwise AND combination.

It is to be noted that (A<<<s) & (0xFF . . . F<<s) only have rotations and a bitwise AND combination. These are rotation invariant as explained above. Therefore, using the rotated operand A'=A<<<r, the shift parameter s, and the rotation parameter r, the logic circuit 210 can implement the shift of the non-rotated operand A through C=(0xFF . . . F<<s)<<<r T=A'<<<s

T=T & C.

This provides the correct result T=(A<<s)<<<r, which by back rotation 212 provides the correct result A<<s of a shift of A.

The data word C can be seen as a bit mask rotated by r. For example, for r=4 and s=3, (for a 32-bit word) C=0xFFFFFF8F. Thus T=T & C can be seen as bit masking.

For modular addition, the logic circuit 210 is to produce the output T=(A+B)<<<r for rotated operands (A<<<r), (B<<<r), using the rotation parameter r, such that the correct result A+B is obtained by back rotation 212. Here, A+B denotes the result of the modular addition of A and B, i.e., the result of the addition where if a carry occurs in the addition of the most significant bits of A and B (plus any carry of the second most significant digit), the carry is omitted.

According to one embodiment, this can be achieved, for example, with a Kogge-Stone adder by replacing all shift operations in the implementation with the rotation-invariant shift operation described previously.

Kogge-Stone Adder:

Input: a, b; Output r s=a^b; g=a & b;

t=s & (g<<1); g=g^t; p=s & (s<<1);

t=p & (g<<2); g=g^t; p=p & (p<<2);

t=p & (g<<4); g=g^t; p=p & (p<<4);

t=p & (g<<8); g=g^t; p=p & (p<<8);

t=p & (g<<16); g=g^t;

r=s^(g<<1);

Here ^ and & denote a bitwise exclusive OR combination and a bitwise AND combination, respectively.

According to a further embodiment, correct calculation of modular addition for rotated operands is achieved by passing each carry bit from a full adder through a gate to the following full adder, masking out the carry at the correct location (given by the rotation parameter).

Figure 4:
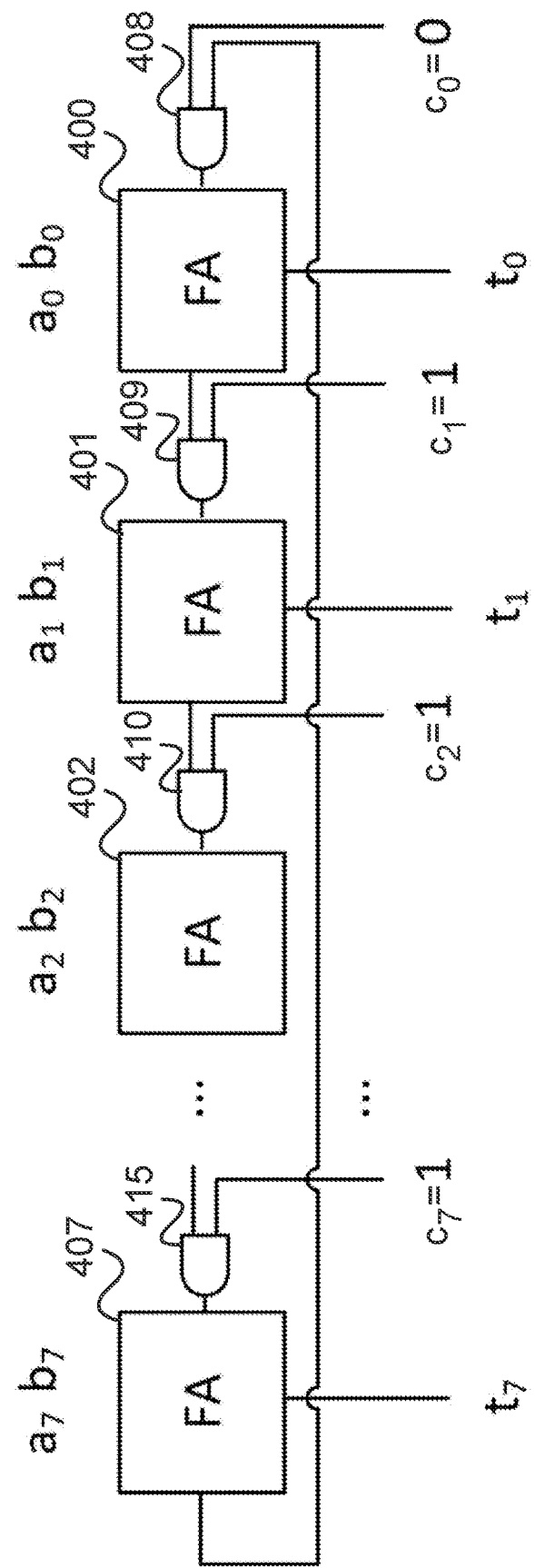
FIG. 4 illustrates an addition of two 8-bit numbers using a chain of full adders, according to one embodiment.

FIG. 4 illustrates an addition of two 8-bit numbers using a chain of full adders 400 to 407, according to one embodiment.

The full adders 400, 401, 402, 407 are cyclically connected by AND gates 408, 409, 410, 415, through which the carry bit can be passed from one full adder to the next.

In the example of FIG. 4, it is assumed that the two operands $A=a_7 \ldots a_0$ and $B=b_7 \ldots b_0$ are not rotated.

Accordingly, the carry bit is to be passed from the full adder for the zeroth bit, the full adder 400, to the full adder for the first bit, the full adder 401. For this reason, the AND gate 409 that is connected between these two full adders 400, 401 receives a bit masking bit $c_1=1$ as a further input (in addition to the carry bit of the full adder 400).

Likewise, the carry bit is to be passed from the full adder for the first bit, the full adder 401, to the full adder for the second bit, the full adder 402. For this reason, the AND gate 410 that is connected between these two full adders 401, 402 also receives a bit masking bit $c_2=1$.

This applies to all pairs of consecutive full adders, except for the pair of the full adder for the seventh bit (full adder 407) and the full adder for the zeroth bit (full adder 400). For this reason, the AND gate 408 connected between these two full adders 407, 400 receives a bit masking bit $c_0=0$.

So in this example there is no carry to the zeroth position (i.e. to the least significant bit) to be done and therefore by $c_0=0$ this carry is masked out.

However, if the operands are rotated, the position at which the carry is to be masked out is shifted accordingly.

Figure 5:
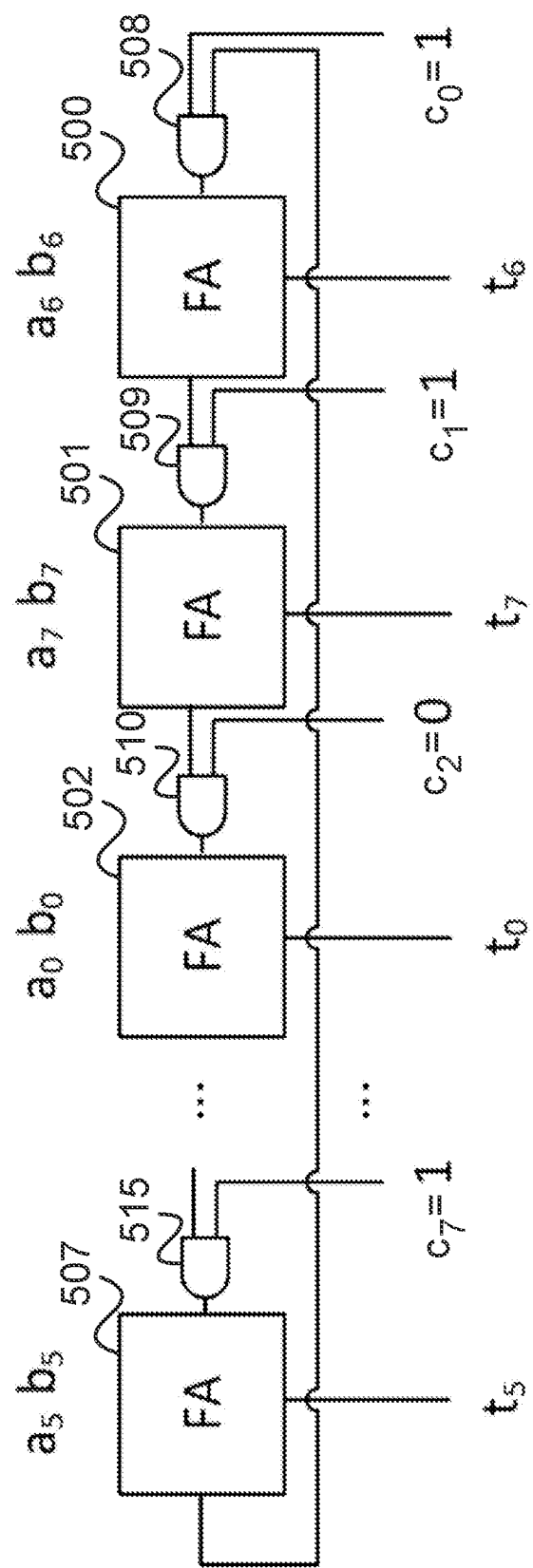
FIG. 5 illustrates an addition of two rotated 8-bit numbers using a chain of full adders, according to one embodiment.

FIG. 5 illustrates an addition of two rotated 8-bit numbers using a chain of full adders 500 to 507, according to one embodiment.

As in the example of FIG. 4, the full adders 500, 501, 502, 507 are cyclically connected by AND gates 508, 509, 510, 515 through which the carry bit can be passed from one full adder to the next.

In this example it is assumed that the two operands $A=a_7 \ldots a_0$ and $B=b_7 \ldots b_0$ are rotated to the left by r=2 bit positions.

Thus, illustratively speaking, the most significant bits of the (unrotated) operands $a_7$ and $b_7$ are no longer at the full adder 507 for the seventh digit, but at the full adder 501 for the first digit.

Thus, no carry is to be passed from the full adder 501 for the first digit to the full adder 502 for the second digit.

Accordingly, the AND gate 510 connected between these two full adders 501, 502 is supplied with the bit masking bit $c_2=0$.

Bit masking bits having a value of 1 are supplied to all other AND gates 508, 509, 515 to pass on the respective carry bit.

Thus, in this example with 8-bit word length, the logic circuit uses a bit masking word $C=c_7 \ldots c_0$, where $C=\text{FE}\lll r$.

Figure 6:
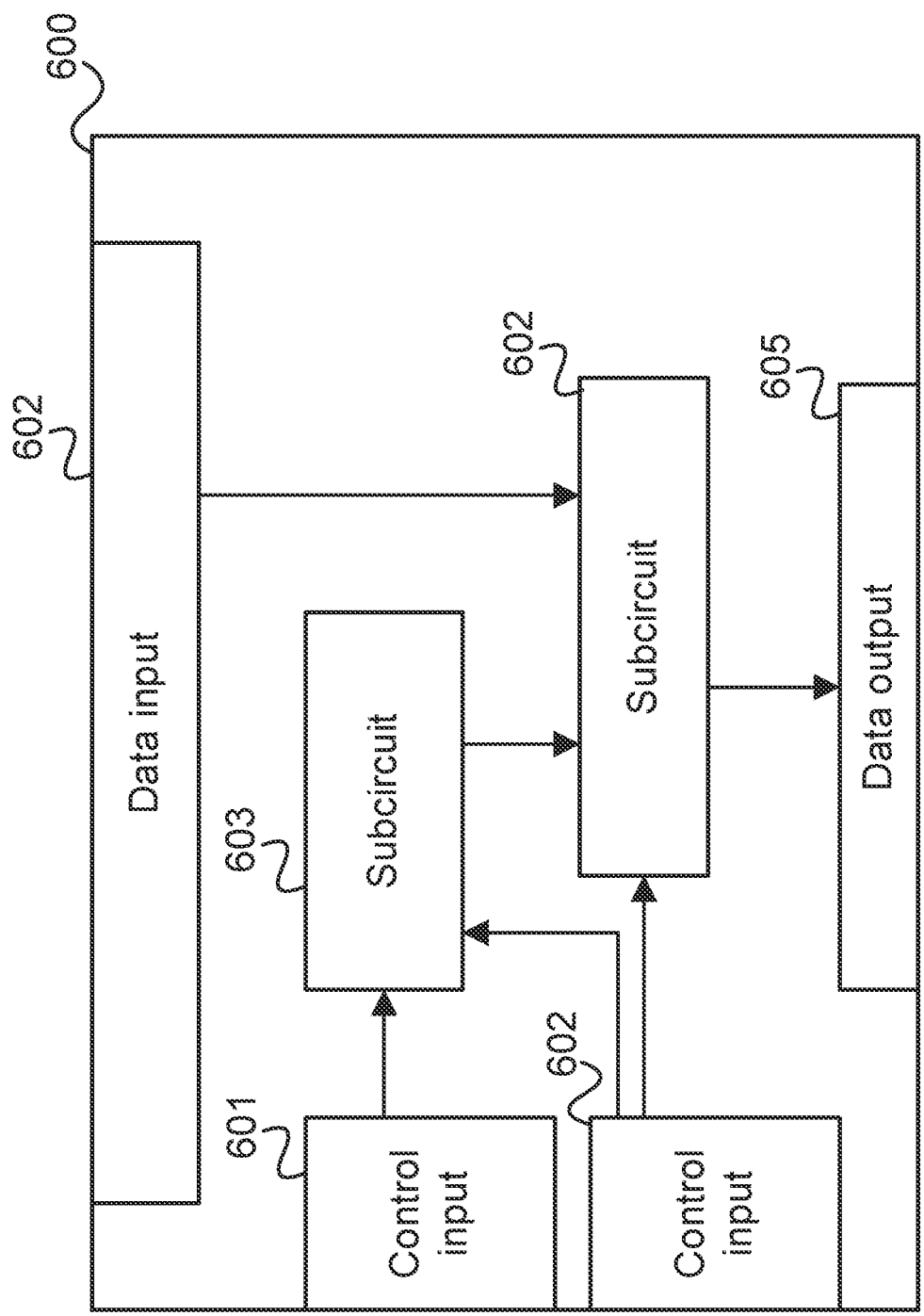
FIG. 6 illustrates a circuit for rotation-invariant execution of one or more operations with at least one operand, according to one embodiment.

In summary, according to various aspects of the disclosure, a circuit is provided as shown in FIG. 6.

FIG. 6 illustrates a circuit 600 for rotation-invariant execution of one or more operations with at least one operand, according to one embodiment.

The circuit 600 includes a data input 601 configured to receive a data word, the data word including at least one operand rotated by a number of bits given by a rotation parameter.

The circuit 600 further includes a first control input 601 configured to receive the rotation parameter, and a second control input 602 configured to receive an indication of an operation to be performed.

Further, the circuit 600 includes a first subcircuit 603 configured to generate an operation and rotation dependent bit mask from the rotation parameter and the indication of the operation to be performed, and a second subcircuit 604 configured to process the at least one operand depending on the bit mask and the operation to be performed, wherein the operand and the operation result generated by the processing remain in the rotated state.

The circuit 600 further includes a data output 605 configured to output the operation result.

For example, the circuit corresponds to logic circuit 210.

According to various aspects of the disclosure, in other words, an operation that is not rotation-invariant per se, is performed by a (logic) circuit that performs the operation in a rotation-invariant manner using a suitable bit mask.

For example, the circuit performs a masking operation, which is to be performed at a specific location depending on the rotation for performing the operation, at the correct location according to the rotation parameter. For example, in a shift operation, the zeros are not inserted at the rightmost position (at the least significant bit position) but, if the operand is rotated, at a position given by the rotation parameter (e.g., r positions further to the left if the operand is rotated by r positions). With a modular addition, the carry is accordingly not truncated at the most significant bit position, but at a position given by the rotation parameter (e.g. r positions further "left" if the operand is rotated by r positions, counting cyclically).

The approach according to FIG. 6 allows for hiding in the hardware with little additional hardware cost. Hiding creates noise from an attacker's point of view and complicates template attacks, for example.

Illustratively, the rotation distributes data (over time) to different parts of the hardware where it is physically processed. In particular, the different bits of the operands are distributed to different bit lines. This increases robustness to side-channel attacks. If the rotation is performed by software, this can be seen as an interaction of software and hardware to protect against side channel attacks. This allows the at least one operand, which may contain secret data such as key data, to be kept more secret.

The memory is, for example, a random access memory (e.g., a RAM) of the data processing device or a non-volatile memory.

According to one embodiment, a rotation invariant processing subcircuit is provided. This processes the operand(s) using a bit mask so that it performs the rotation-dependent parts of the operation at the correct position of the operand(s), i.e. sets the correct parts of the operand(s) to 0 or 1 depending on the operation. The rotation invariant parts (bits) can be processed (e.g. using the inverse bit mask) directly and bit by bit.

FIG. 7 illustrates a flowchart 700 illustrating a method of performing one or more operations on at least one operand in a rotation-invariant manner.

In 701, a data word is received, the data word including at least one operand rotated by a number of bits given by a rotation parameter.

In 702 the rotation parameter is received.

In 703, an indication of an operation to be performed is received.

In 704 an operation and rotation dependent bit mask is generated from the rotation parameter and the indication of the operation to be performed.

In 705, the at least one operand is processed depending on the bit mask and the operation to be performed, wherein the operand and the operation result generated by the processing remain in the rotated state.

The operation result is output in 706.

It should be noted that 701 through 706 need not be performed in the order shown.

Various aspects of the disclosure will now be described by the following examples.

Example 1 is a circuit as described with reference to FIG. 6.

Example 2 is a circuit according to Example 1, wherein the operation result is rotated with respect to an unrotated operation result with an unrotated data word by a number of bits given by the rotation parameter Example 3 is a circuit according to Example 1 or 2, wherein when the operand is processed, all intermediate results remain in the rotated state.

Example 4 is a circuit according to any one of Examples 1 to 3, wherein the operation to be performed is a non-rotation invariant operation.

Example 5 is a circuit according to any one of Examples 1 to 4, wherein the operation to be performed is an addition or a shift operation.

Example 6 is a circuit according to any one of Examples 1 to 5, wherein the first subcircuit is configured to generate the bit mask by rotating a bit masking word predetermined for the operation by the number of bit positions given by the rotation parameter.

Example 7 is a circuit according to any one of Examples 1 to 6, wherein the second subcircuit is configured to mask out one or more bits of the at least one operand or one or more bits of an intermediate result of the operation according to the bit mask using a masking operation.

Example 8 is a circuit according to Example 7, wherein the operation is a shift operation by a predetermined number of bits of an operand, and the masking operation is a masking out of the predetermined number of bits of the operand.

Example 9 is a circuit according to any one of Examples 1 to 7, wherein the operation is a shift of an operand and the indication of the operation to be performed includes the value of a shift parameter indicating by how many bit positions the operand is to be shifted.

Example 10 is a circuit according to Example 6, wherein the operation is a shift operation by a predetermined number of bits of an operand, and the bit masking word is a word in which the predetermined number of least significant bits are set to zero and the more significant bits are set to one.

Example 11 is a circuit according to Example 7, wherein the operation is an addition of two operands and the masking operation is masking out a carry of an addition at a given bit location.

Example 12 is a circuit according to Example 7, wherein the operation is an addition of two operands and the bit mask is a word of the same length as the operands, with all but one bit having the same value.

Example 13 is a circuit according to Example 12, wherein the second subcircuit is configured to mask the carries of a chain of full adders that add the two operands and are cyclically connected to pass carries using the bit mask.

Example 14 is a circuit according to any one of Examples 1 to 13, wherein the at least one operand includes at least a portion of a cryptographic key.

Example 15 is a circuit according to any one of Examples 1 to 14, including a processor including the sub-circuits and configured to perform a cryptographic method using the at least one operand and to perform the operation as part of the cryptographic method.

Example 16 is a circuit according to Example 15, wherein the cryptographic method is a decrypting or a signing of further data to be cryptographically processed or a key generation.

Example 17 is a circuit according to Example 15 or 16, wherein the processor is a reduced instruction set computer (RISC) processor.

Example 18 is a circuit according to any one of Examples 15 to 17, wherein the processor is an Advanced RISC Machine (ARM) processor.

Example 19 is a method as described with reference to FIG. 7.

Example 20 is a method according to Example 19, wherein the operation result is rotated with respect to an unrotated operation result with an unrotated data word by a number of bits given by the rotation parameter Example 21 is a method according to Example 19 or 20, wherein all intermediate results remain in the rotated state when processing the operand.

Example 22 is a method according to any one of Examples 19 to 21, wherein the operation to be performed is a non-rotation invariant operation.

Example 23 is a method according to any one of Examples 19 to 22, wherein the operation to be performed is an addition or a shift operation.

Example 24 is a method according to any one of Examples 19 to 23, wherein the bit mask is generated by rotating a bit mask word predetermined for the operation by the number of bit locations given by the rotation parameter.

Example 25 is a method according to any one of Examples 19 to 24, wherein one or more bits of the at least one operand or one or more bits of an intermediate result of the operation are masked out according to the bit mask using a masking operation.

Example 26 is a method according to Example 25, wherein the operation is a shift operation by a predetermined number of bits of an operand, and the masking operation is a masking out of the predetermined number of bits of the operand.

Example 27 is a method according to any one of Examples 19 to 25, wherein the operation is a shift of an operand and the indication of the operation to be performed includes the value of a shift parameter indicating by how many bit positions the operand is to be shifted.

Example 28 is a method according to Example 24, wherein the operation is a shift operation by a predetermined number of bits of an operand, and the bit masking word is a word in which the predetermined number of least significant bits are set to zero and the more significant bits are set to one.

Example 29 is a method according to Example 25, wherein the operation is an addition of two operands and the masking operation is masking out a carry of an addition at a given bit location.

Example 30 is a method according to Example 25, wherein the operation is an addition of two operands and the bit mask is a word of the same length as the operands in which all but one bit has the same value.

Example 31 is a method according to Example 30, wherein the carries of a chain of full adders that add the two operands and are cyclically connected to pass carries are masked using the bit mask.

Example 32 is a method according to any one of Examples 19 to 31, wherein the at least one operand includes at least a portion of a cryptographic key.

Example 33 is a method according to any one of Examples 19 to 32, including performing a cryptographic method using the at least one operand and performing the operation as part of the cryptographic method.

Example 34 is a method according to Example 33, wherein the cryptographic method is a decrypting or a signing of further data to be cryptographically processed or a key generation.

Example 35 is a method according to Example 33 or 34, performed by a RISC processor.

Example 36 is a method according to any one of Examples 33 to 35, performed by an ARM processor.

According to a further Example, there is provided a data processing device including a memory configured to store at least one operand of an operation to be performed, the operation including a rotation invariant sub-operation and a bit masking sub-operation, a logic circuit including an input configured to receive at least one operand rotated by a number of bit positions given by a rotation parameter the logic circuit being configured to receive the rotation parameter and to process the at least one rotated operand according to the operation to be performed, the logic circuit being configured to process the at least one rotated operand according to the rotation invariant sub-operation and to perform the bit masking sub-operation on a bit location of the at least one rotated operand given by the rotation parameter.

According to a further Example, there is provided a circuit for rotation invariant shifting of an operand, including a data input configured to receive a data word, the data word including an operand rotated by a number of bits given by a rotation parameter, a first control input configured to receive a shift parameter value indicating a number of bits by which the operand is to be shifted, a second control input configured to receive the rotation parameter a bit mask generation circuit configured to determine a bit mask corresponding to a shift of a word having the length of the data word and consisting of only binary ones by the number of bit positions given by the shift parameter and to rotate the bit mask by the number of bits given by the rotation parameter, and a rotation circuit configured to rotate the data word by the number of bits given by the shift parameter, a masking circuit configured to mask the rotated data word with the rotated bit mask, and a data output that is configured to output the masked rotated data word.

Although the invention has been shown and described primarily with reference to certain aspects of the disclosure, it should be understood by those skilled in the art that numerous changes in aspect and detail may be made thereto without departing from the spirit and scope of the invention as defined by the following claims. The scope of the invention is therefore defined by the appended claims, and it is intended that all changes which fall within the literal or equivalent scope of the claims be embraced.

LIST OF REFERENCE SIGNS

100 Processing device
101 CPU
102 RAM
103 Non-volatile memory
104 Crypto module
105 Bus
106 Analog module
107 Input/output interface
108-111 Crypto Cores
112 Hardware random number generator
200 Data processing device
201 Processor
202 Operand
203 Rotation
204 Random number generator
205 rotated operand
206, 207 Registers
208, 209 Bit lines
210 Logic circuit
211 Result register
212 Back rotation
213 Rotation parameter
301, 302 Lines
400-402 Full adder
407 Full adder
408-410 AND gate
415 AND gate
500-502 Full adder
507 Full adder
508-510 AND gate
515 AND gate
600 Circuit
601, 602 Control inputs
603, 604 Subcircuits
605 Data output
700 Flow diagram
701-706 Processing operations

What is claimed is:

1. A circuit for the rotation-invariant execution of one or more operations with at least one operand, comprising:
a data input configured to receive a data word, the data word comprising at least one operand rotated by a number of bits given by a rotation parameter;
a first control input configured to receive the rotation parameter;
a second control input configured to receive an indication of an operation to be performed;
a first subcircuit configured to generate an operation- and rotation-dependent bit mask from the rotation parameter and the indication of the operation to be performed;
a second subcircuit configured to generate an operation result by processing the at least one operand as a function of the bit mask and the operation to be performed, wherein the operand and the operation result generated by the processing remain in the rotated state; and
a data output which is configured to output the operation result.

2. The circuit of claim 1, wherein the second subcircuit is further configured to rotate the operation result with an unrotated data word by a number of bits given by the rotation parameter.

3. The circuit of claim 1, wherein when second subcircuit processes the operand, all intermediate results remain in the rotated state.

4. The circuit of claim 1, wherein the operation to be performed is a non-rotation invariant operation.

5. The circuit of claim 1, wherein the operation to be performed is an addition or a shift operation.

6. The circuit of claim 1, wherein the first subcircuit is configured to generate the bit mask by rotating a bit mask word predetermined for the operation by a number of bit locations given by the rotation parameter.

7. The circuit of claim 1, wherein the second subcircuit is configured to mask out one or more bits of the at least one operand or one or more bits of an intermediate result of the operation according to the bit mask using a masking operation.

8. The circuit of claim 7, wherein the operation is a shift operation by a predetermined number of bits of an operand and the masking operation is a masking out of the predetermined number of bits of the operand.

9. The circuit of claim 1, wherein the operation is a shift of an operand and the indication of the operation to be performed comprises the value of a shift parameter indicating by how many bit positions the operand is to be shifted.

10. The circuit of claim 6, wherein the second subcircuit is configured to perform the operation by shifting an operand by a predetermined number of bits, and wherein the bit mask word is a word in which the predetermined number of bits of the least significant bits are set to zero and any more significant bits are set to one.

11. The circuit of claim 7, wherein the operation is an addition of two operands and the masking operation is a masking out of a carry of an addition at a given bit location.

12. The circuit of claim 7, wherein the operation is an addition of two operands and the bit mask is a word of the same length as the operands with all but one bit having the same value.

13. The circuit of claim 12, wherein the second subcircuit is configured to mask, using the bit mask, the carries of a chain of full adders that add the two operands and that are cyclically connected to pass carries.

14. The circuit of claim 1, wherein the at least one operand comprises at least a portion of a cryptographic key.

15. The circuit of claim 1, comprising a processor comprising the subcircuits and configured to perform a cryptographic process using the at least one operand and to perform the operation as part of the cryptographic process.

16. The circuit of claim 15, wherein the cryptographic method is a decrypting or a signing of further data to be cryptographically processed or a key generation.

17. The circuit of claim 15, wherein the processor is a Reduced Instruction Set Computer (RISC) processor.

18. The circuit of claim 15, wherein the processor is an Advanced Reduced Instruction Set Computer (RISC) Machine (ARM) processor.

19. A method of rotation-invariant execution of one or more operations with at least one operand comprising:

receiving a data word, the data word comprising at least one operand rotated by a number of bits given by a rotation parameter;

receiving the rotation parameter;

receiving an indication of an operation to be performed;

generating an operation and rotation dependent bit mask from the rotation parameter and the indication of the operation to be performed;

generating an operation result by processing the at least one operand depending on the bit mask and the operation to be performed, wherein the operand and the operation result remain in the rotated state; and outputting the operation result.

* * * * *